United States Patent [19]
Hata

[11] Patent Number: 6,091,906
[45] Date of Patent: Jul. 18, 2000

[54] FLASH DEVICE

[75] Inventor: Yukitsugu Hata, Kanagawa, Japan

[73] Assignee: Fuji Photo Film Co., Ltd., Kanagawa, Japan

[21] Appl. No.: 09/317,942

[22] Filed: May 25, 1999

[30] Foreign Application Priority Data

May 26, 1998 [JP] Japan .................................. 10-144693

[51] Int. Cl.[7] .................................................. G03B 15/05
[52] U.S. Cl. .......................................... 396/206; 396/203
[58] Field of Search .................................... 396/203, 205, 396/206; 315/241 P, 129, 136

[56] References Cited

U.S. PATENT DOCUMENTS

| | | | |
|---|---|---|---|
| 4,260,231 | 4/1981 | Kawarada | 396/203 |
| 4,430,602 | 2/1984 | Ohmori | 315/241 P |
| 5,966,552 | 10/1999 | Hata | 396/206 |
| 5,974,267 | 10/1999 | Motomura | 396/206 X |
| 6,035,141 | 3/2000 | Constable | 396/206 |

FOREIGN PATENT DOCUMENTS

| | | |
|---|---|---|
| 08115796 | 5/1996 | Japan . |
| 2535884 | 2/1997 | Japan . |
| WO 99/10772 | 3/1999 | WIPO . |

*Primary Examiner*—W. B. Perkey
*Attorney, Agent, or Firm*—Young & Thompson

[57] ABSTRACT

In a flash device, a three-terminal switch is provided for connecting or disconnecting between a secondary coil of an oscillating transformer and a base of an oscillating transistor, between the secondary coil of the oscillating transformer and a triggering capacitor, and between the triggering capacitor and a primary coil of a triggering transformer. When the three-terminal switch is turned on, a biasing current is supplied to the base of the oscillating transistor, so a current flows through a primary coil of the oscillating transformer, and a secondary current from the secondary coil of the oscillating transformer is supplied to the main capacitor through the three-terminal switch and a base-emitter circuit of the oscillating transistor, to charge the main capacitor. The secondary current is also supplied to the triggering capacitor through the three-terminal switch, to charge the triggering capacitor. When a triggering switch is turned on while the three-terminal switch is on, the triggering capacitor discharges current through the primary coil of the triggering transformer, generating a triggering voltage for a flash discharge tube. If the three-terminal switch is turned off, the biasing current and the secondary current are cut from the oscillating transistor, and the triggering capacitor cannot discharge.

4 Claims, 7 Drawing Sheets

FLASH DEVICE

BACKGROUND OF THE INVENTION

1. Field of the Invention

The present invention relates to a flash device having a flash discharge tube which flashes based on an electric energy charged in a main capacitor, and more particularly to a flash device that allows to choose whether the flash device is to fire or not when a triggering voltage is applied to the flash discharge tube upon a triggering switch being turned on synchronously with a shutter release of a camera.

2. Background Arts

When the subject brightness is so low that a proper exposure would not be provided without any artificial illumination, a flash device is often used to project light toward a photographic subject synchronously with releasing the shutter. Since compact cameras and lens-fitted photo film units have an inexpensive lens system of a relatively large f-number, it is desirable to provide them with a built-in flash device. To enable the flash device to fire, it is necessary to charge a main capacitor of the flash device up to a set voltage prior to the shutter release. Conventionally, a flash charge switch is previously turned on to start charging the flash device when to make a flash photography.

A flash device is also known in the art where the photographer can choose whether to fire the flash device or not by setting a switching member to an ON position or an OFF position respectively, for example, by Japanese Utility Model Registration No. 2,535,884 and U.S. patent application No. 08/933,984, now U.S. Pat. No. 5,966,552. Hereinafter, this type of flash device will be called an ON-OFF type flash device.

FIG. 4 shows a flash circuit of the ON-OFF type flash device disclosed in the above mentioned Japanese Utility Model Registration. In this flash circuit, an oscillation transistor 29 and an oscillation transformer 30 constitute a well-known blocking oscillator that transforms a low-level power source voltage from a battery 19 into a high-level voltage used for charging a main capacitor 16. When a biasing current from the battery 19 flows through a tertiary coil 33 of the oscillation transformer 30 into a base of the oscillation transistor 29, the oscillation transistor 29 lets a collector current or a primary current flow through a primary coil 31 of the oscillation transformer 30. Because the primary current induces an electromotive force on a secondary coil 32 of the oscillation transformer 30, a secondary current flows through the secondary coil 32. As the secondary current is fed back to the base of the oscillation transistor 29, the oscillation transistor 29 oscillates and amplifies the primary current. As a result, the primary current increases up to about 5A or so. During this oscillation, the main capacitor 16 is charged with the secondary current at a high voltage level.

A flash charge switch 67 is connected to an emitter of the oscillation transistor 29. The flash charge switch 67 is turned on or off to conduct or not conduct the biasing current from the battery 19, and thus the primary current and the secondary current. Thereby, the flash charge switch 67 is used to choose whether the oscillating transistor 29 should oscillate for charging or not. A flash ON-OFF switch 68 is connected between the emitter of the oscillating transformer 30 and a triggering capacitor 35. The flash ON-OFF switch 68 is turned on and off by the same switching member that is operated to turn the flash charge switch 67 on and off. At one switching position of the switching member, both of the switches 67 and 68 are on, whereas these switches 67 and 68 are off at the other switching position.

While the flash ON-OFF switch 68 is on, the secondary current flows through the flash ON-OFF switch 68 and charges the triggering capacitor 35, and the triggering capacitor 35 may discharge the current upon a synchronized triggering switch 18 being turned on. As the current discharged from the triggering capacitor 35 flows into a primary coil of a triggering transformer 37, a triggering voltage is applied to a flash discharge tube 38. Then, the main capacitor 16 is discharged through the flash discharge tube 38. Thus, the flash device fires. While the flash ON-OFF switch 68 is off, even when the triggering switch 18 is turned on, since the current does not flows from the triggering capacitor 35 into the triggering transformer 37, the flash device does not fire.

According to the circuit of FIG. 4, each of the flash charge switch 67 and the flash ON-OFF switch 68 is connected directly to the emitter of the oscillation transistor 29, so that these switches 67 and 68 may be constituted of a three-terminal contact having a fixed common terminal and two respective terminals. The three-terminal contact contributes to reducing the space for mounting these switching 67 and 68, and the number of elements and thus the number of manufacturing processes of the flash device.

FIG. 5 shows a flash circuit of the ON-OFF flash device disclosed in the above mentioned U.S. Application, wherein a flash charge switch 67 is connected between a plus pole of a battery 19 and a tertiary coil 33, whereas a flash ON-OFF switch is connected in series to a triggering capacitor 35. Also in this flash circuit, since one terminal of the flash charge switch 67 is connected directly to one terminal of the flash ON-OFF switch 68, the flash charge switch 67 and the flash ON-OFF switch 68 may be constituted of a three-terminal contact.

The circuit of FIG. 5 further has an oscillation stopping circuit 40 for deactivating the blocking oscillator when the main capacitor 16 is charged up to the set voltage, and a light emitting diode 48 that starts lighting to indicate completion of charging when the main capacitor 16 is almost charged up to the set voltage.

FIG. 6 shows a modification of the flash circuit of FIG. 5, wherein a flash charge switch 67 is connected between a plus pole of a battery 19 and a connecting point of primary and tertiary coils 31 and 33. Other constructions are the same as shown in FIG. 5. Also in this circuit, the flash charge switch 67 and a flash ON-OFF switch 68 may be constituted of a three-terminal contact.

According to the flash circuit of FIG. 4, the flash charge switch 67 is connected in a primary circuit of the blocking oscillator, through which the primary current flows. The primary circuit is from a plus pole of the battery 19 through the primary coil 31 and the emitter-collector circuit of the oscillating transistor 29 to a minus pole of the battery 19. As the primary current flows through the flash charge switch 67, the primary current is reduced by a contact resistance of the flash charge switch 67. The reduction of the primary current results in a reduction of the secondary current, so that electric energy supplied per a given time to the main capacitor 16 is reduced, so it takes longer to charge the main capacitor 16 up to the set voltage than without the flash charge switch 67. The same problem occurs wherever the flash charge switch 67 is connected in the primary circuit, for example, as shown in FIG. 6.

Because the flash charge switch 67 is not connected in the primary circuit of the blocking oscillator in the flash circuit of FIG. 5, there is not any problem of the contact resistance. However, even while the flash charge switch 67 is off, the flash charge switch 67 just stops the bias current from being supplied to the oscillating transistor 29, whereas the primary coil 31 is kept being connected to the battery 19, and the secondary current can flows from the secondary coil 32 into the base of the oscillating transistor 29, so that the oscillating transistor 29 oscillates by itself. The oscillating transistor 29 does not stop oscillating and thus charging until the oscillation stopping circuit 40 is activated as the main capacitor 16 is fully charged. Since the light emitting diode 48 continues to light so long as the main capacitor 16 is almost fully charged, even after the flash ON-OFF switch and the flash charge switch are turned off concurrently, the photographer may misunderstand that the flash device is ready to flash, or something goes wrong with the flash device.

The above problems with the flash circuits of FIGS. 4 to 6 are solved by connecting a flash charge switch 67 to a base of an 29 as shown in FIG. 7. In the flash circuit of FIG. 7, however, since a flash ON-OFF switch 68 is connected between an emitter of the oscillating transistor 29 and a triggering capacitor 35, it is impossible to constitute these switches 67 and 68 of a three-terminal contact, and it is necessary to provide a two-terminal contact for each of these switches 67 and 68 separately.

Therefore, the flash circuit of FIG. 7 needs a larger mounting space for these switches 67 and 68, as well as a larger number of manufacturing processes. Thus the manufacturing cost inevitably increases. When operating these switches 67 and 68 concurrently, the increase in the number of terminals and contact members results in increasing the probability of contact failure and other malfunction of these switches 67 and 68.

In view of the foregoing, an object of the present invention is to provide a flash device that uses a three-terminal contact commonly for a flash charge switch and a flash ON-OFF switch, but does not take a long time to charge up, and can stop charging quickly.

SUMMARY OF THE INVENTION

According to the present invention, a flash device is provided with a biasing circuit for conducting a biasing current from a power source to a base of an oscillating transistor, to activate the oscillating transistor; a primary circuit for conducing a current from the power source through a primary coil of an oscillating transformer and a collector-emitter circuit of the oscillating transistor, to induce a secondary current on a secondary coil of the oscillating transformer; a main charging circuit for conducting the secondary current through a base-emitter circuit of the oscillating transistor to a main capacitor, to oscillate the oscillating transistor and charge the main capacitor with the secondary current; a subsidiary charging circuit for conducting the secondary current to a triggering capacitor, to charge the triggering capacitor with the secondary current; a triggering circuit for conducting current from the triggering capacitor to a primary coil of a triggering transformer through a triggering switch, to induce a triggering voltage on a secondary coil of the triggering transformer; and a three-terminal switch provided for connecting or disconnecting between the secondary coil of the oscillating transformer and the base of the oscillating transistor, between the secondary coil of the oscillating transformer and the triggering capacitor, and between the triggering capacitor and the primary coil of the triggering transformer, such that the biasing circuit, the main charging circuit and the subsidiary charging circuit are closed by turning on the three-terminal switch, and the triggering circuit is closed by turning on the triggering switch while the three-terminal switch is on.

Since the three-terminal switch is not provided in the primary circuit, the primary current is not reduced by the contact resistance of the three-terminal switch.

A contact plate for connecting between three terminals of the three-terminal switch is preferably secured to one of the three terminals, in order to lower the probability of occurrence of contact failure.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
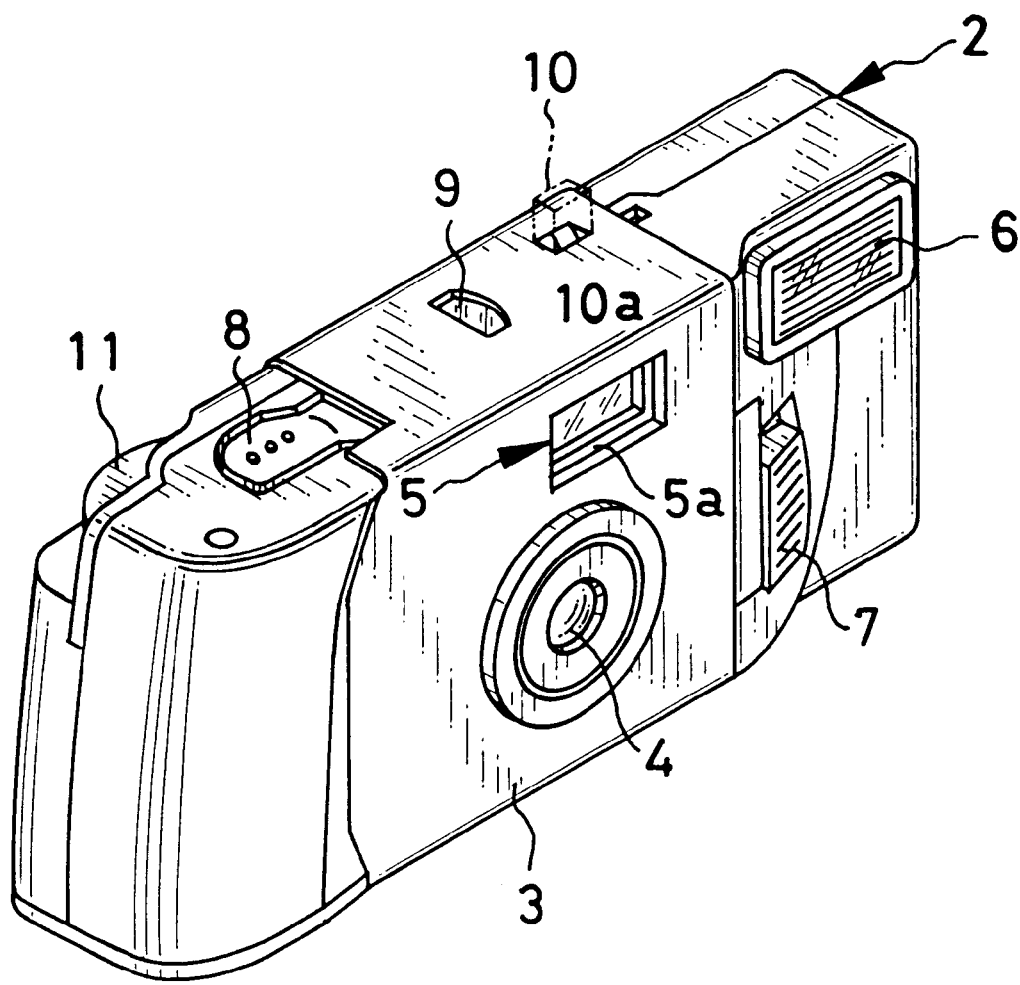
FIG. 1 is a perspective view of a film unit with a flash device according to an embodiment of the invention.

Referring to FIG. 1, a lens-fitted photo film unit, hereinafter referred to as a film unit, has a unit body 2 containing a photo filmstrip. Simple photographic mechanisms and a flash device are incorporated into the unit body 2. A decorative cardboard paper 3 is wrapped around the unit body 2. A taking lens 4, a finder objective window 5, a flash projector 6 of a built-in flash device, a flash switch knob 7, a shutter button 8, a frame counter window 9, a flash indication window 10*a*, a film winding wheel 11, and other necessary elements are exposed to the outside through openings of the cardboard paper 3 or located out of the cardboard paper 3.

The flash switch knob 7 is slidable up and down between a lower OFF position shown in FIG. 1 and an upper ON position, and is click-stopped at either position. As the flash switch knob 7 is pushed up, a light guide 10 is protruded through the flash indication window 10*a*. The light guide 10 is used to indicate that the flash device is ready to flash, as set forth in detail later.

Figure 2:
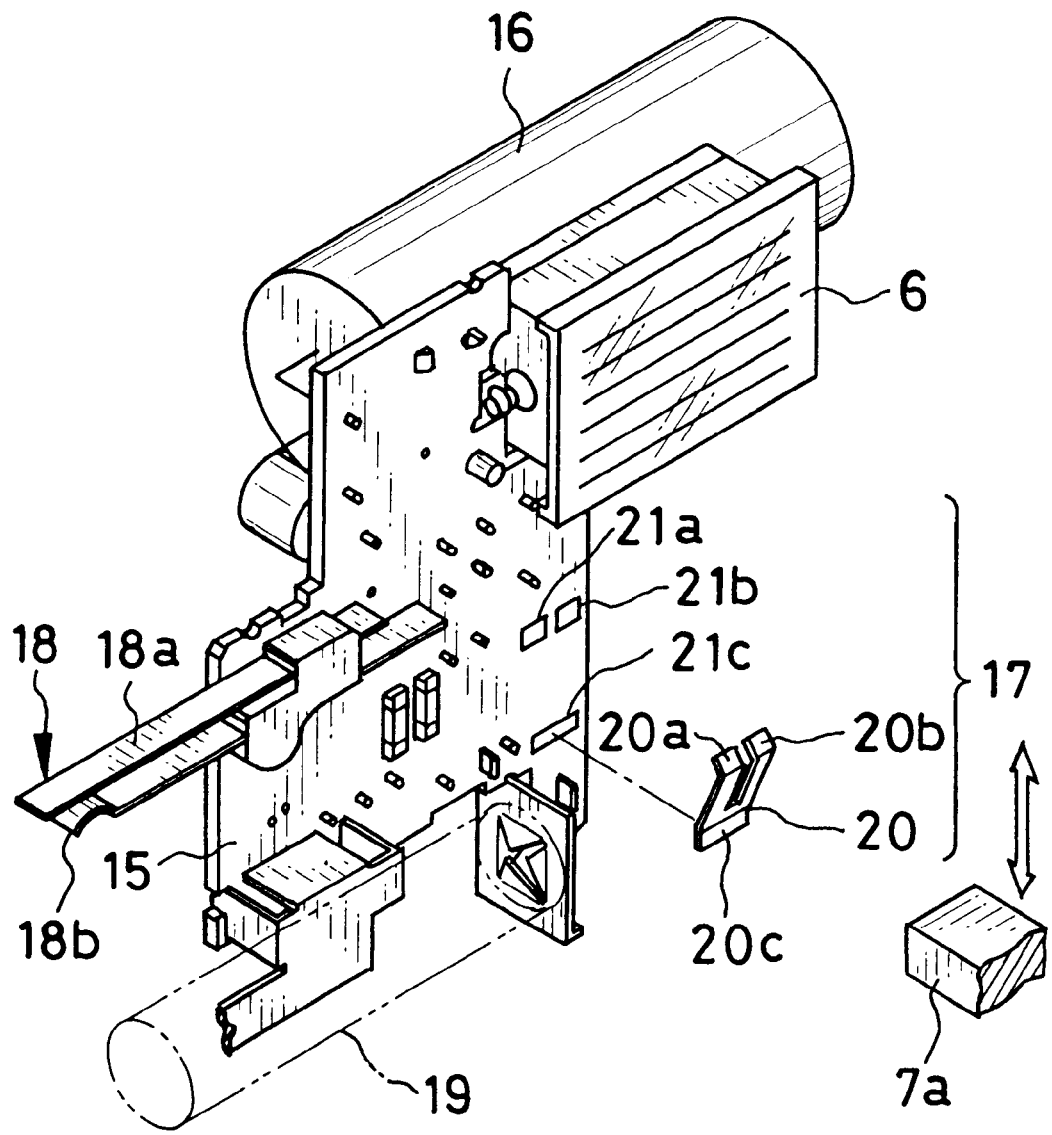
FIG. 2 is a perspective view of the flash device.

As shown in FIG. 2, the flash device built in the unit body 2 is an assembly wherein the flash projector 6, a main capacitor 16, a switching section 17, and a triggering switch 18 are mounted on a flash circuit board 15, and a battery 19 is connected to the flash circuit on the board 15 as a power source.

The switching section 17 provides a three-terminal contact device consisting of a contact plate 20 and first to third contacts or lands 21*a*, 21*b* and 21*c* formed on the flash circuit board 15. The contact plate 20 is formed from a resilient conductive metal blade, and has one end forked into two resilient arms 20*a* and 20*b*. The contact plate 20 is secured to the flash circuit board 15 by soldering one end 20c opposite to the arms 20a and 20b to the third contact 21c. The first and second arms 20a and 20b are respectively opposed to the first and second contacts 21a and 21b, and stay away from the contacts 21a and 21b without any external force.

The switching section 17 is actuated by the flash switch knob 7. Where the flash switch knob 7 is in the OFF position, the resilient arms 20a and 20b are off the contacts 21a and 21b. By sliding the flash switch knob 7 up to the ON position, a projection 7a formed on the back side of the flash switch knob 7 pushes the resilient arms 20a and 20b down on the first and second contacts 21a and 21b respectively, electrically connecting the first and second contacts 21a and 21b to the third contact 21c. As set forth in detail below, the switching section 17 functions as a flash charge switch and a flash ON-OFF switch.

The triggering switch 18 consists of a pair of contact strips 18a and 18b. When the shutter button 8 is pushed down to release a shutter mechanism, a not-shown shutter blade pushes the upper contact strip 18a down on the lower contact strip 18b, turning on the triggering switch 18. Thus, the timing of firing the flash device is synchronized with the shutter release.

Figure 3:
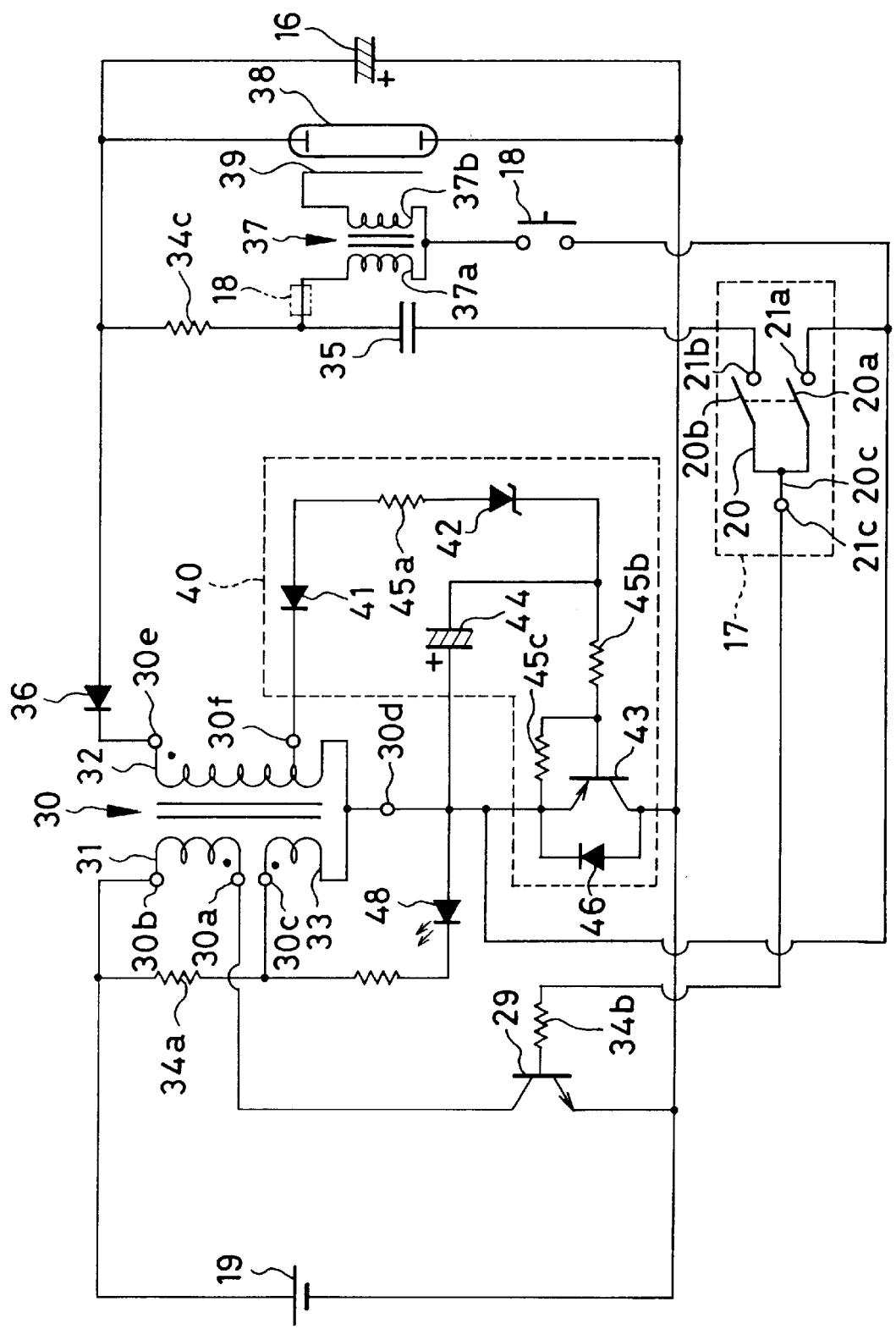
FIG. 3 is a circuit diagram of a flash circuit of the flash device.
Figure 4:
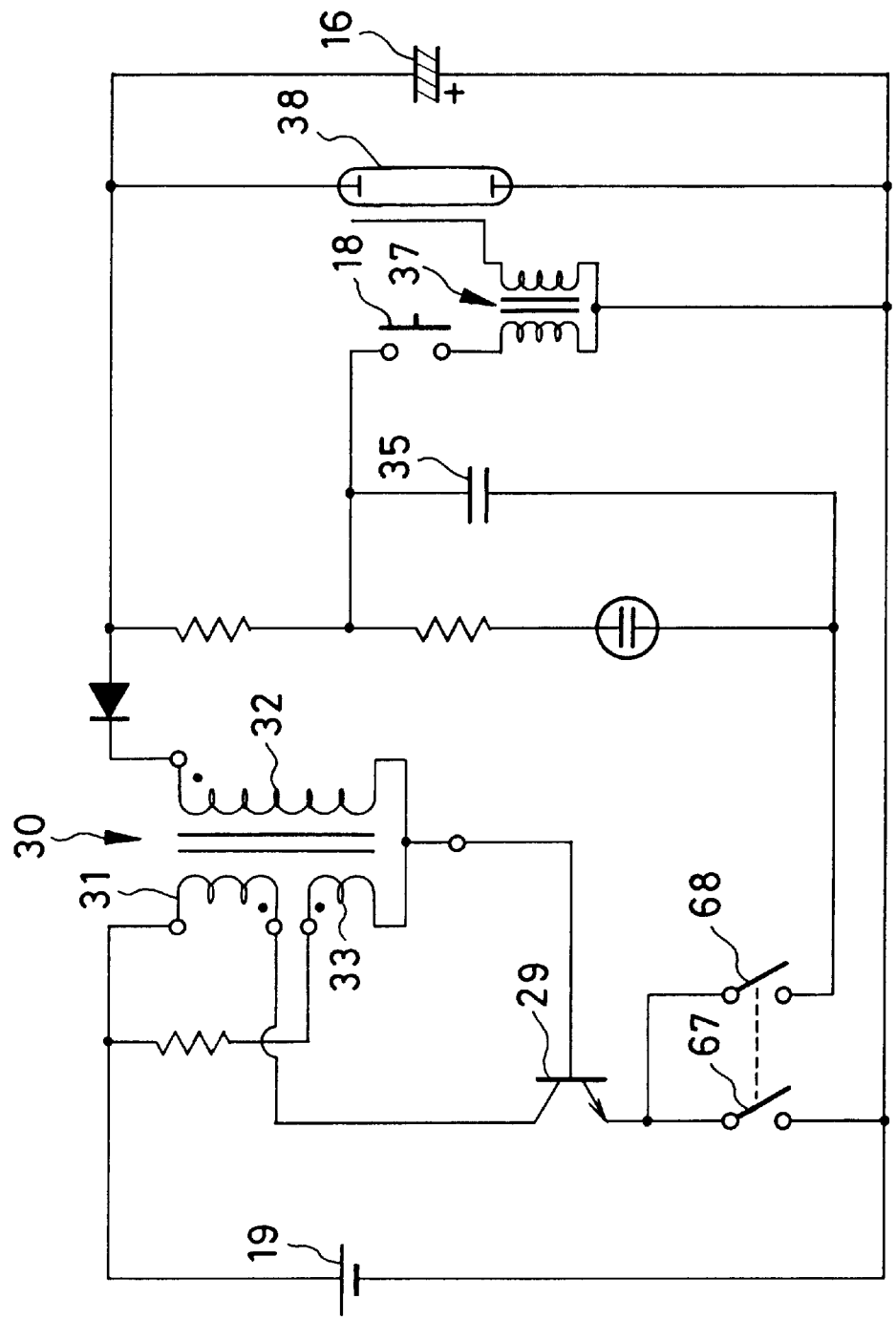
FIG. 4 is a circuit diagram of a flash circuit of a prior art.
Figure 5:
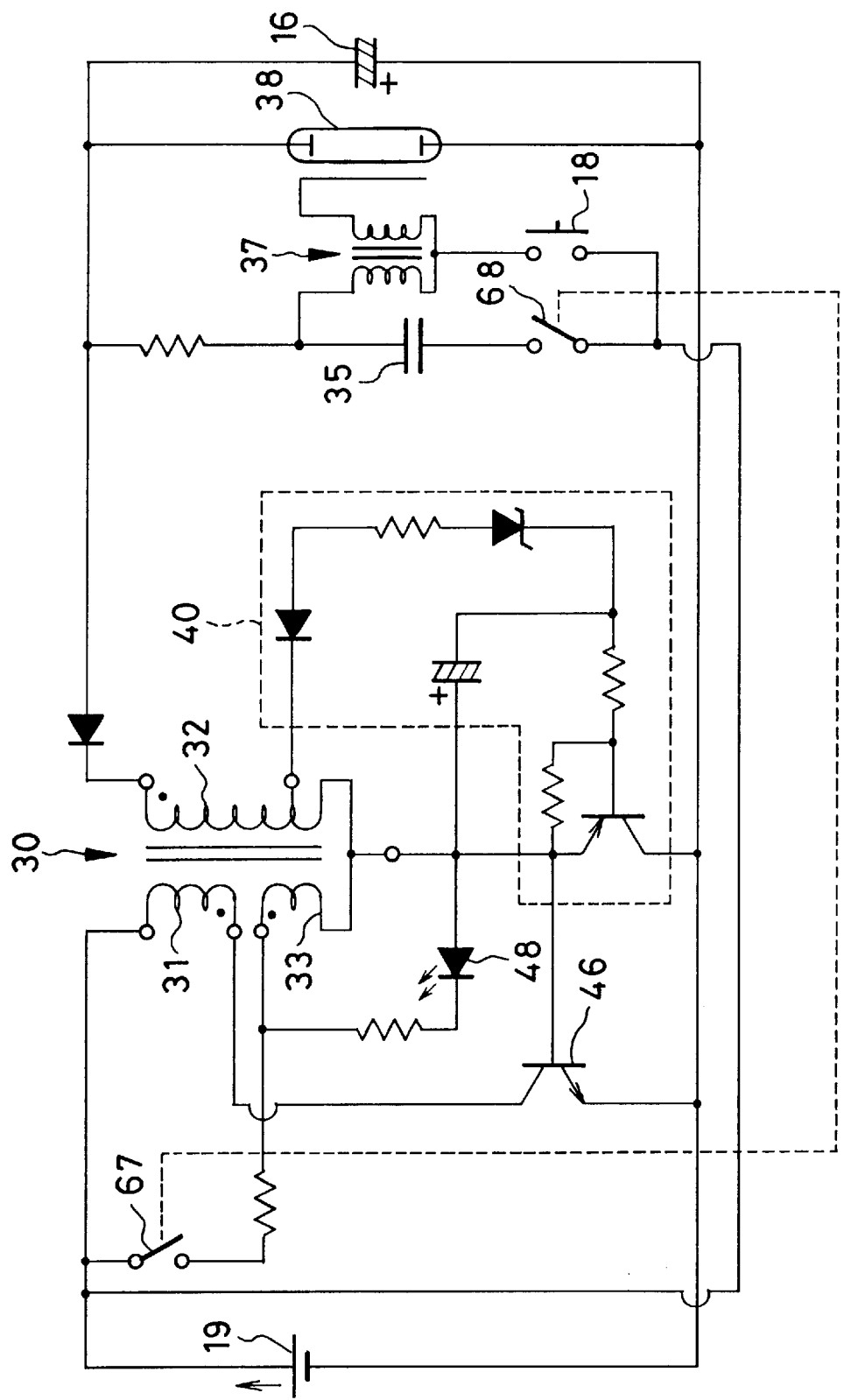
FIG. 5 is a circuit diagram of a flash circuit of another prior art.
Figure 6:
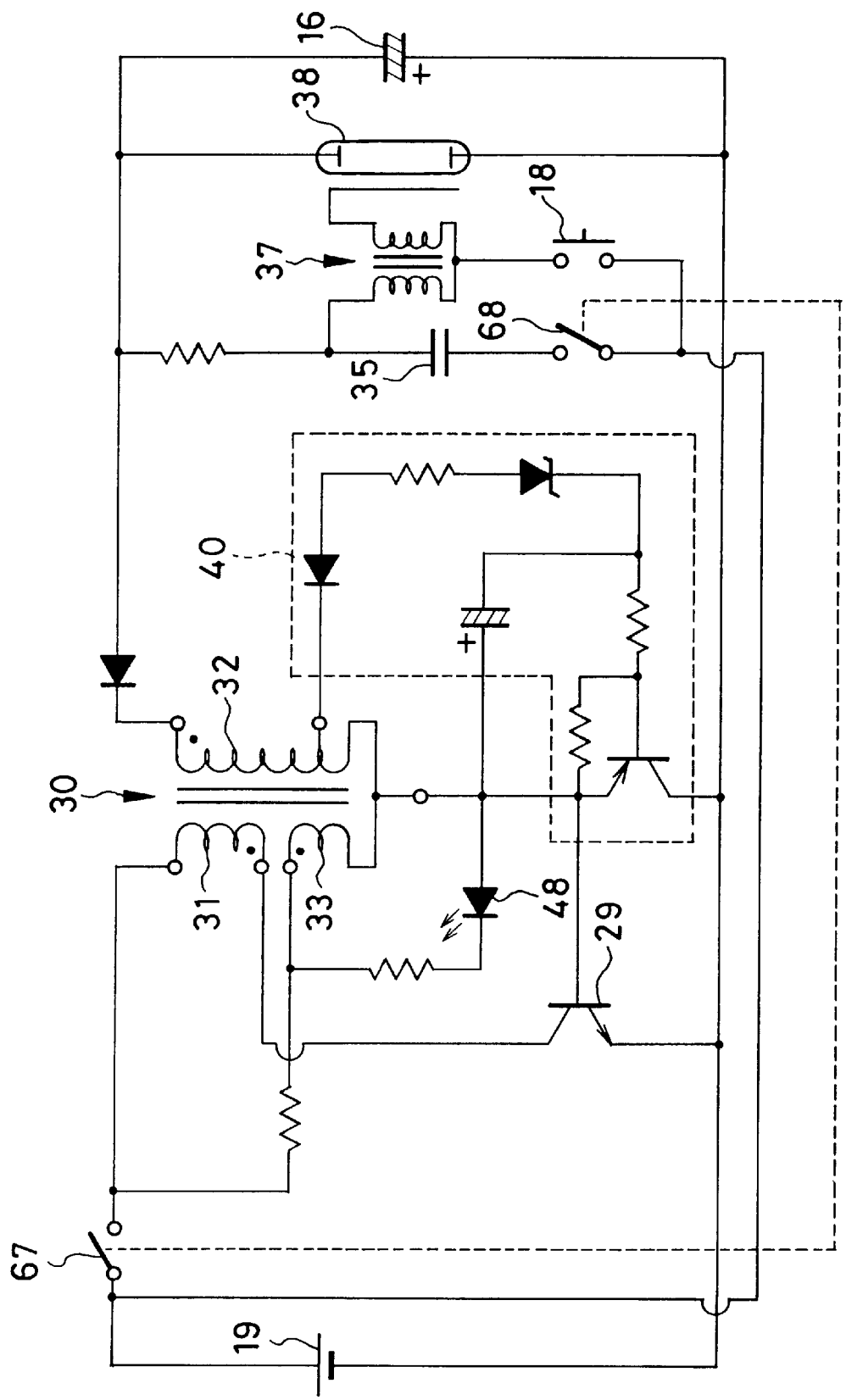
FIG. 6 is a circuit diagram of a flash circuit of a third prior art.
Figure 7:
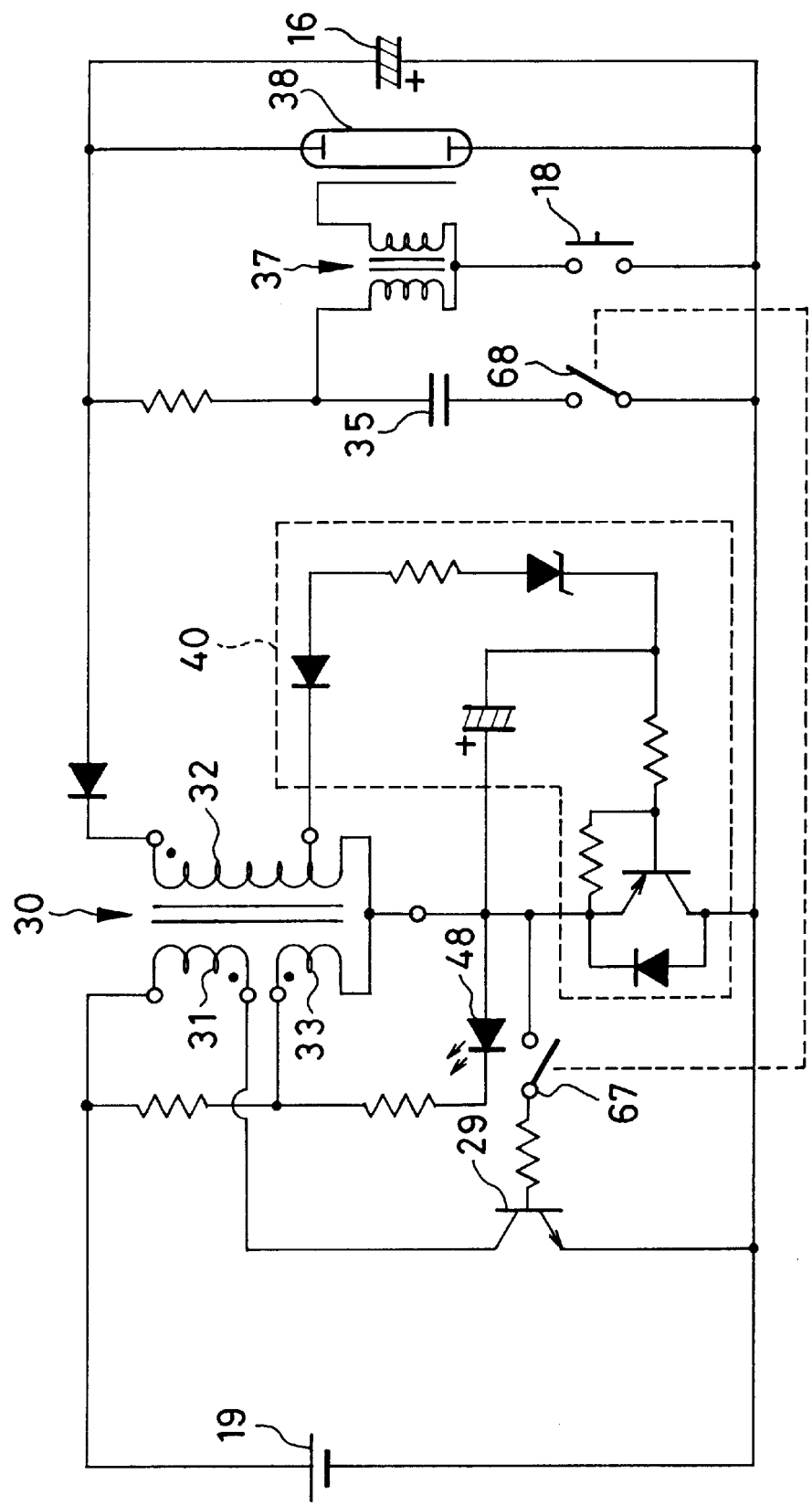
FIG. 7 is a circuit diagram of a flash circuit of a fourth prior art.

FIG. 3 shows the flash circuit of the flash device, wherein an oscillating transistor 29 and an oscillating transformer 30 constitutes a well-known blocking oscillator for transforming a low-level voltage of the battery 19 to a high-level voltage. The oscillating transformer 30 is constituted of a primary coil 31, a secondary coil 32 and a tertiary coil 33 which are inductively coupled to one another.

In the oscillating transformer 30, terminals of the primary coil 31 are referred to as first and second terminals 30a and 30b, one terminal of the tertiary coil 33 is referred to as a third terminal 30c, another terminal of the tertiary coil 33, which is also one terminal of the secondary coil 32, is referred to as a fourth terminal 30d, and another terminal of the secondary coil 32 is referred to as a fifth terminal 30e. The oscillating transformer 30 has a tap point 30f at an intermediate position of the secondary coil 32, in addition to the first to fifth terminals 30a to 30e.

The first and second terminals 30a and 30b of the oscillating transformer 30 are connected to the collector of the NPN oscillating transistor 29, and the plus pole of the battery 19, respectively. The third terminal 30c is connected to the plus terminal of the battery 19 through a resistor 34a. The fourth terminal 30d is connected to the base of the oscillating transistor 29 through the switching section 17 and a resistor 34b. The fourth terminal 30d is connected also to a first pole of a triggering capacitor 35 through the switching section 17. The fifth terminal 30e is connected to a cathode of a charge current rectifying diode 36. An anode of the charge current rectifying diode 36 is connected to a minus pole of the main capacitor 16, and through a resistor 34c to a second pole of the triggering capacitor 35. The emitter of the oscillating transistor 29 is connected to the minus pole of the battery 19 and is grounded, as well as to a plus pole of the main capacitor 16.

The triggering transformer 37 consists of a primary coil 37a and a secondary coil 37b which are inductively coupled to each other and have a common terminal. A second terminal of the primary coil 37a is connected to the second pole of the triggering capacitor 35. A second terminal of the secondary coil 37b is connected to a triggering electrode 39 that is located close to a flash discharge tube 38. The flash discharge tube 38 is located inside the flash projector 6. The common terminal of these coils 37a and 37b is connected through the triggering switch 18 to the switching section 17. The flash discharge tube 38 is connected in parallel to the main capacitor 16.

According to this configuration, the circuit from the plus pole of the battery 19, through the resistor 34a, the tertiary coil 33, the switching section 17, the resistor 34b, and the emitter-collector circuit of the oscillating transistor 29 to the minus pole of the battery 19 constitutes a biasing circuit for conducting a biasing current to activate the oscillating transistor 29. The circuit from the fourth terminal 30d of the secondary coil 32, through the switching section 17, the base-emitter circuit of the oscillating transistor 29, and the main capacitor 16, the rectifying diode 36, to the fifth terminal 30e of the secondary coil 32 constitutes a main charging circuit for conducting a secondary current from the secondary coil 32 to oscillate the oscillating transistor 29 and charge the main capacitor 16. The circuit from the fourth terminal 30d of the secondary coil 32, through the switching section 17 and the triggering capacitor 35 to the fifth terminal of the secondary coil 32 constitutes a subsidiary charging circuit for conducting the secondary current to charge the triggering capacitor 35.

On the other hand, the circuit from the first pole of the triggering capacitor 35, through the switching section 17, the triggering switch 18, and the primary coil 37a of the triggering transformer 37 to the second pole of the triggering capacitor 35 constitutes a triggering circuit for conducting current through the primary coil 37a to induce a triggering voltage on the secondary coil 37b.

In this embodiment, the first contact 21a is connected to the fourth terminal 30d of the oscillating transformer 30 and to the triggering switch 18, and the second contact 21b is connected to the first pole of the triggering capacitor 35, whereas the third contact 21c is connected to the base of the oscillating transistor 29 through the resistor 34b. Thus, the biasing current and the secondary current is supplied to the base of the oscillating transistor 29 through the first and third contacts 21a and 21c, whereas the triggering circuit is closed when the first and second contacts 21a and 21b are connected each other and the triggering switch 18 is turned on.

When the switching section 17 is turned on, the biasing current and the secondary current are supplied to the oscillating transistor 29. Also the secondary current is supplied to the triggering capacitor 35. When the triggering switch 18 is turned on while the switching section 17 is on, the triggering circuit is closed to discharge the triggering capacitor 35, conducting current through the primary coil 37a. Thus, the flash discharge tube 38 is triggered to flash. When the switching section 17 is turned off, the biasing current and the secondary current are disconnected from the oscillating transistor 29. While the switching section 17 is off, even when the triggering switch 18 is on, the triggering circuit is maintained open, so the flash discharge tube 38 is not triggered.

The flash device also has an oscillation stopping circuit 40 that is mainly constituted of a rectifying diode 41, a Zener diode 42, a PNP stopping transistor 43, a stopping capacitor 44 and resistors 45a, 45b and 45c. A cathode of the rectifying diode 41 is connected to the tap point 30f, and an anode of the rectifying diode 41 is connected to an anode of the Zener diode 42 through a resistor 45a. The rectifying diode 41 is provided for rectifying an alternating voltage at the tap point 30f, and applies only negative halves of the alternating voltage to the Zener diode 42.

The potential level Va at the tap point 30f varies alternately in correspondence with the oscillation of the oscillating transformer 30. Beside that, the potential level Va in total changes proportionally to the charge voltage in the main capacitor 16. In this embodiment, the main capacitor 16 is designed to be charged in the negative direction, the positive terminal of the main capacitor 16 is maintained 0V, and the potential level at the negative pole of the main capacitor 16 goes down. Accordingly, the potential Va at the tap point 30f goes down proportionally as the charge voltage increases. The tap point 30f is located such that the potential difference or voltage "Vb−Va" between the fourth terminal 30d and the tap point 30f comes to a given voltage Von when the main capacitor 16 reaches a set charge voltage, e.g. 300V. The voltage Von is given by adding a voltage drop amount through the rectifying diode 41, e.g. about 0.6V, to a Zener voltage, e.g. 10V, of the Zener diode 42.

When the main capacitor 16 is charged up to the set voltage, the Zener current flows through the Zener diode 42. The stopping capacitor 44 is charged with the Zener current up to an appropriate voltage and, thereafter, discharges through a resistor 45b. The current from the stopping capacitor 44 flows into the base of the stopping transistor 43, turning on the stopping transistor 43. A collector of the stopping transistor 43 is grounded and is connected to the emitter of the oscillating transistor 29, whereas an emitter of the stopping transistor 43 is connected to the fourth terminal 30d of the oscillating transformer 30, i.e. to the base of the oscillating transistor 29 through the switching section 17. Thereby, when the stopping transistor 43 is turned on, the base of the oscillating transistor 29 is connected to the emitter thereof through the stopping transistor 43, so that the oscillating transistor 29 is turned off, stopping charging the main capacitor 16.

When the voltage of the discharged stopping capacitor 44 goes below a predetermined value, the stopping transistor 43 is turned off. So long as the switching section 17 is on, the current from the battery 21 restarts flowing into the base of the oscillating transistor 22, so that the oscillating transistor 22 restarts oscillating. Since the main capacitor 41 has already been charged up to the set voltage, the Zener current flows through the Zener diode 57 as soon as the oscillation restarts. The stopping capacitor 44 is fully charged with the Zener current soon, and then restarts discharging, so the stopping transistor 43 is turned on in short time after the restart of oscillation. Thus, charging the main capacitor 16 is terminated soon. In this way, the stopping transistor 43 is turned on and off repeatedly, so that the oscillating transistor 29 stops and restarts oscillating repeatedly. Therefore, so long as the switching section is in the ON state, the main capacitor 16 is charged repeatedly and intermittently to supplement natural discharge of the main capacitor 16.

The rectifying diode 41 also functions as a temperature compensating element for the Zener diode 42. As well-known in the art, the conductivity of semiconductor elements varies depending upon their temperatures. Concerning rectifying diodes in general, the voltage drop varies depending upon the temperature. Concerning the Zener diodes in general, their Zener voltages vary with temperature. Specifically, those Zener diodes whose set Zener voltage is less than 5V to 6V have a negative temperature coefficient each, so their actual Zener voltages decrease with temperature increase. On the contrary, those Zener diodes whose set Zener voltage is more than 5V to 6V have a positive temperature coefficient each, so the actual Zener voltage increases with the temperature increase. As the Zener voltage is set to be 10V in this instance, the Zener diode 42 has a positive temperature coefficient, so the actual Zener voltage goes up as the temperature goes up. Without any temperature compensation, the Zener diode 42 would not start conducting the Zener current until the main capacitor 16 has been charged up to a value more than the set value.

On the other hand, rectifying diodes have negative temperature coefficients. That is, as the temperature increases, voltage drop through the rectifying diode 41 decreases, and thus the voltage applied to the Zener diode 42 increases. Since the negative temperature coefficient of the rectifying diode 41 is designed to compensate for the positive temperature coefficient of the Zener diode 42, the total temperature coefficient of the diodes 41 and 42 is approximately zero. In this way, the Zener current begins to flow at the set charge voltage of the main capacitor 16, regardless of the temperature variations.

Because electric noise is generated by the discharge of the triggering capacitor 35, and is applied to the base of the oscillating transistor 29, a diode 46 is connected in parallel to the emitter-collector circuit 43 of the stopping transistor 43 in order to reduce the noise and protect the oscillating transistor 29.

A light emitting diode (LED) 48 is provided for indicating completion of charging of the main capacitor 16. An anode of the LED 48 is connected to the fourth terminal 30d, and a cathode to the third terminal 30c of the oscillating transformer 30, such that the LED 48 starts lighting when the main capacitor 16 is charged up to a predetermined voltage, e.g. 265V in this instance. Detail of the LED 48 is disclosed in JPA 8-115796. The light from the LED 48 is conducted through the light guide 10, so the photographer can see if the main capacitor 16 is fully charged or not.

Now, the operation of the above described embodiment will be described. First the photographer rotates the film winding wheel 16 of the film unit 10 to wind up the filmstrip by one frame and also cock the shutter mechanism at the same time. To make a flash photography, the flash switch knob 7 is slid to the ON position. Then, the light guide 10 is protruded out through the flash indication window 10a, and the projection 7a on the back of the flash switch knob 7 pushes the resilient arms 20a and 20b to bring them into contact with the first and second contacts 21a and 21b respectively. Thus, the switching section 17 is turned on.

When the switching section 17 is turned on, the biasing circuit is closed, and the base current is applied to the base of the oscillating transistor 29 through the resistor 34a, the tertiary coil 33, the first contact 21a, the contact plate 20, the third contact 21c, and the resistor 34b. Thereby, the oscillating transistor 29 is activated to conduct the collector current as much as the base current. As the collector current flows from the second terminal 30b through the primary coil 31 to the first terminal 30a, the collector current is equal to the primary current.

Because of the primary current, an electromotive force of a higher voltage is generated in the secondary coil 32 according to the turn ratio of the secondary coil 32 to the primary coil 31. The electromotive force causes the secondary current to flow through the secondary coil 32. Because of the rectifying diode 36, the secondary current flows in the direction from the fifth terminal 30e to the fourth terminal 30d. Since the switching section 17 is turned on, the secondary current flows through the main charging circuit, that is, through the first contact 21a, the contact plate 20, the third contact 21c, the base-emitter circuit of the oscillating transistor 29 and the main capacitor 16.

Because of the secondary current supplied to the base of the oscillating transistor 29 through the switching section 17, that is, positive feedback from the oscillating transformer 30, the base current of the oscillating transistor 29 increases, so the collector current of the oscillating transistor 29, i.e. the primary current through the primary coil 31 increase. With the increase in the primary current, the electromotive force increases, e.g., up to 300V.

As the oscillating transistor 29 is being saturated, the collector current is getting less increase. Thereby, the change in the primary current becomes smaller, and back electromotive forces are generated in the respective coils 31 to 33 of the oscillating transformer 30. Due to the back electromotive forces, the current flowing from the secondary coil 32 to the base of the oscillating transistor 29 drops down. Thus, the collector current of the oscillating transistor 29 drops down.

However, because the biasing current is supplied from the battery 19 to the base of the oscillating transistor 29, the oscillating transistor 29 is not completely turned off. After the back electromotive forces on the oscillating transformer 30 are gone, the collector current of the oscillating transistor 29 and thus the primary current begin to increase again. In this way, so long as the switching section 17 is on, the oscillating transistor 29 continues to oscillate. Thus, the main capacitor 16 is charged with the secondary current. Since the switching section 17 also closes the subsidiary charging circuit, a fragment of the secondary current from the fourth terminal 30d flows into the triggering capacitor 35 through the first contact 21a, the contact plate 20 and the second contact 21b. Thus the triggering capacitor 35 is charged with this secondary current.

As the main capacitor 16 is charged, the voltage across the main capacitor 16 increases, and the load on the secondary coil 32 increases. As a result, the secondary current decreases, and the voltage of the electromotive force and that of the back electromotive force on the secondary coil 32 go down. In addition, the oscillation frequency of the blocking oscillator goes up. Therefore, the cycle of change in the potential level Va as well as in the potential level Vb is getting shorter.

Since the main capacitor 16 is charged in the negative direction, the potential level Va goes down as the whole. On the other hand, the potential level Vb at the fourth terminal 30d changes between the same levels as in the first stage of charging. Consequently, the potential level Va goes below the potential level Vb while the electromotive force is generated, so that the reverse voltage starts to be applied across the Zener diode 42 through the rectifying diode 41.

However, until the charge voltage of the main capacitor reaches the set value, the potential difference (Vb−Va) is less than the given voltage Von, so the voltage applied to the Zener diode 42 is less than the Zener voltage. Therefore, the Zener diode 42 does not conduct the Zener current, and the stopping transistor 43 is not turned on until the main capacitor 16 is charged up to the set charge voltage. In this way, the oscillating transistor 29 continues to oscillate until the main capacitor 16 is charge up to the set charge voltage.

When the main capacitor 16 is charged up to the set voltage, the Zener voltage is applied across the Zener diode 42 through the rectifying diode 41, so that the Zener current flows through the Zener diode 42. Then the stopping capacitor 44 is charged with the Zener current, and discharge current to the base of the stopping transistor 43, turning on the stopping transistor 43. When the stopping transistor 43 is turned on, the base of the oscillating transistor 29 is connected to the emitter thereof through the stopping transistor 43, so that the oscillating transistor 29 is turned off, thereby stopping charging the main capacitor 16.

As being charged directly with the Zener current, the stopping capacitor 44 is charged up in a short time. On the contrary, as the stopping capacitor 44 being discharged through the resistor 45b, the stopping transistor 43 is turned on for a sufficient time, e.g. 0.3 seconds, enough to deactivate the oscillating transistor 29 even while the switching section 17 is on.

The oscillation stopping circuit 40 repeats stopping the oscillating transistor 29 from oscillating each time the main capacitor 16 is charged up to the set voltage, and allows the oscillating transistor 29 to oscillate each time the charge voltage of the main capacitor 16 goes below the predetermined level, in the way as set forth above.

The LED 48 starts lighting when the charge voltage of the main capacitor 16 reaches the predetermined level, i.e. 265V in this instance, and continues to light till the charge voltage reaches the set value, i.e. 300V. Thereafter, the LED 48 lights intermittently at the same interval as the oscillating transistor 29 oscillates intermittently in correspondence with the intermittent charging of the main capacitor 16 by the oscillation stopping circuit 40. The interval of intermission may be determined by adjusting a time constant that is defined by a capacitance of the stopping capacitor 44 and a resistance of the resistor 45b, as well as by defining the time duration to turn on the stopping transistor 43.

When the shutter button 18 is depressed after the LED 48 starts lighting, the shutter mechanism is activated, and the triggering switch 18 is turned on by the shutter blade. Upon the triggering switch 18 being turned on, the triggering capacitor 35 discharges, so that the current flows through the primary coil 37a of the triggering transformer 37, inducing the triggering voltage across the secondary coil 37b. For example, the triggering voltage is 4 KV. The triggering voltage is applied through the triggering electrode 39 to the flash discharge tube 38. Then, the main capacitor 16 is discharged through the flash discharge tube 38. If the main capacitor 16 has been charged fully at that time, the flash discharge tube 38 flashes. The flash light is projected through the flash window 6. In this way, the flash photography is accomplished.

As described so far, because there is not any switch in the primary circuit that conducts the primary current through the primary coil 31, the primary current is not reduced by a contact resistance that would be provided by a switch. Therefore, it takes shorter time to charge up the main capacitor 16. Although the switching section 17 provides the main charging circuit with a contact resistance at the contact point between the contact plate 20 and the first contact 21a, the loss of the electric energy due to this contact resistance is so small that it scarcely delay the time to charge up the main capacitor 16. This is because energy loss due to contact resistance gets smaller at higher voltage. For instance, where the power source voltage of the battery 19 is 1.5V and the voltage induced on the secondary coil 32 is 300V, the energy loss through the switching section 17 in the main charging circuit would be $1/40000 (=(300/1.5)^2)$ that caused by a flash charge switch connected in the primary current circuit on the assumption that the flash charge switch has a same contact resistance as the switching section 17.

To take a photograph without flash, the flash switch knob 7 is slid down to the OFF position. Even if the main capacitor 16 have been charged halfway or fully, when the flash switch knob 7 is set to the OFF position, the switching section 17 is turned off to open the biasing circuit, the main charging circuit and the subsidiary charging circuit. As the biasing circuit is opened, the biasing current does not flow from the battery 19 into the base of the oscillating transistor 29. As the main charging circuit is opened, the secondary current from the secondary coil 32 of the oscillating transformer 30 is not fed back to the oscillating transistor 29. Thus, the oscillating transistor 29 completely stops oscillating, and hence the LED 48 is deactivated. In addition, since the light guide 10 is stowed into the unit body 2 when the flash switch knob 7 is set to the OFF position, the photographer can confirm that the flash device is not going to fire.

The triggering circuit is also opened as the first contact 21a is disconnected from the second contact 21b by turning off the switching section 17. Therefore, though the triggering switch 18 is turned on when the shutter button 8 is depressed even after the flash switch knob 7 is set to the OFF position, the triggering capacitor 35 does not discharge, and thus the triggering voltage is not applied to the flash discharge tube 38. Accordingly, the flash device does not fire even if the main capacitor 16 is fully charged.

Although one end of the contact plate 20 is forked so that the contact plate 20 may be stably brought into contact with the first and second contacts 21a and 21b, the contact plate 20 need not to be forked insofar as it electrically connects these contacts 21a to 21c. The contact plate 20 may be secured to either one of the first to third contacts 21a to 21c. It is also possible to mount the contact plate 20 such that the contact plate 20 stays off any of these contacts 21a to 21c while the flash switch knob 7 is in the OFF position, and comes to contact with these contacts 21a to 21c. However, securing the contact plate 20 to one of these contacts 21a to 21b reduces the probability of occurrence of contact failure.

Moreover, three contacts or terminals of the switching section 17 may be connected to the flash circuit differently from the shown embodiment. That is, the first pole of the triggering capacitor 35 and the base of the oscillating transistor 29 may be connected to one terminal, whereas the fourth terminal 30d of the oscillating transformer 30 and the triggering switch 18 may be respectively connected to other two terminals. In alternative, the base of the oscillating transistor 29 and the triggering switch 18 may be connected to one terminal, whereas the fourth terminal 30d of the oscillating transformer 30 and the first pole of the triggering capacitor 35 may be respectively connected to other two terminals.

The triggering switch 18 may be connected between the second pole of the triggering capacitor 35 and the primary coil 37a of the triggering transformer 37, as implied by phantom lines in FIG. 3. In that case, the switching section 17 is operated to open or close the circuit between the triggering capacitor 35 and the common terminal of the triggering transformer 37, and the triggering capacitor 35 is charged with the secondary current while the switching section is on.

Although the oscillation stopping circuit 40 of the above embodiment is activated based on potential variation at the tap point 30f of the oscillating transformer 30, the flash device of the invention may use an oscillation stopping circuit that is activated based the charge voltage of the main capacitor, or it is possible to omit the oscillation stopping circuit. The LED 48 may be replaced by a conventional neon lamp. The present invention is applicable to a flash circuit where a main capacitor is charged by increasing potential at its plus pole while maintaining its minus pole at a constant potential.

Although the present invention has been described with respect to the built-in flash device of the film unit, the flash device of the present invention may be mounted in any kind of cameras, or may be embodied as a separate apparatus, or an attachment of a camera.

Thus, the present invention should not be limited to the above embodiment but, on the contrary, various modifications may be possible to those skilled in the art without departing from the scope of appended claims.

What is claimed is:

1. A flash device having a flash discharge tube which flashes based on an electric energy charged in a main capacitor when a triggering voltage is applied to the flash discharge tube upon a triggering switch being turned on, the flash device comprising:

a biasing circuit for conducting a biasing current from a power source to a base of an oscillating transistor, to activate the oscillating transistor;

a primary circuit for conducing a current from the power source through a primary coil of an oscillating transformer and a collector-emitter circuit of the oscillating transistor, to induce a secondary current on a secondary coil of the oscillating transformer;

a main charging circuit for conducting the secondary current through a base-emitter circuit of the oscillating transistor to the main capacitor, to oscillate the oscillating transistor and charge the main capacitor with the secondary current;

a subsidiary charging circuit for conducting the secondary current to a triggering capacitor, to charge the triggering capacitor with the secondary current;

a triggering circuit for conducting current from the triggering capacitor to a primary coil of a triggering transformer through the triggering switch, to induce the triggering voltage on a secondary coil of the triggering transformer; and a three-terminal switch provided for connecting or disconnecting between the secondary coil of the oscillating transformer and the base of the oscillating transistor, between the secondary coil of the oscillating transformer and the triggering capacitor, and between the triggering capacitor and the primary coil of the triggering transformer, such that the biasing circuit, the main charging circuit and the subsidiary charging circuit are closed by turning on the three-terminal switch, and the triggering circuit is closed by turning on the triggering switch while the three-terminal switch is on.

2. A flash device as claimed in claim 1, wherein the three-terminal switch comprises a contact plate, the contact plate being secured to one of three terminals of the three-terminal switch and brought into contact with other two terminals, to electrically connect between the three terminals and turn on the three-terminal switch.

3. A flash device as claimed in claim 2, wherein the contact plate has two resilient arms which are brought into contact with the two terminals when an external force is applied to the resilient arms through an operation member.

4. A flash device as claimed in claim 1, wherein three terminals of the three terminal switch are connected respectively to three of the secondary coil, the base of the oscillating transistor, the triggering capacitor and the primary coil of the triggering transformer, whereas one of the three terminals is connected commonly to a remaining one of the secondary coil, the base of the oscillating transistor, the triggering capacitor and the primary coil of the triggering transformer.

* * * * *